Figure 1:
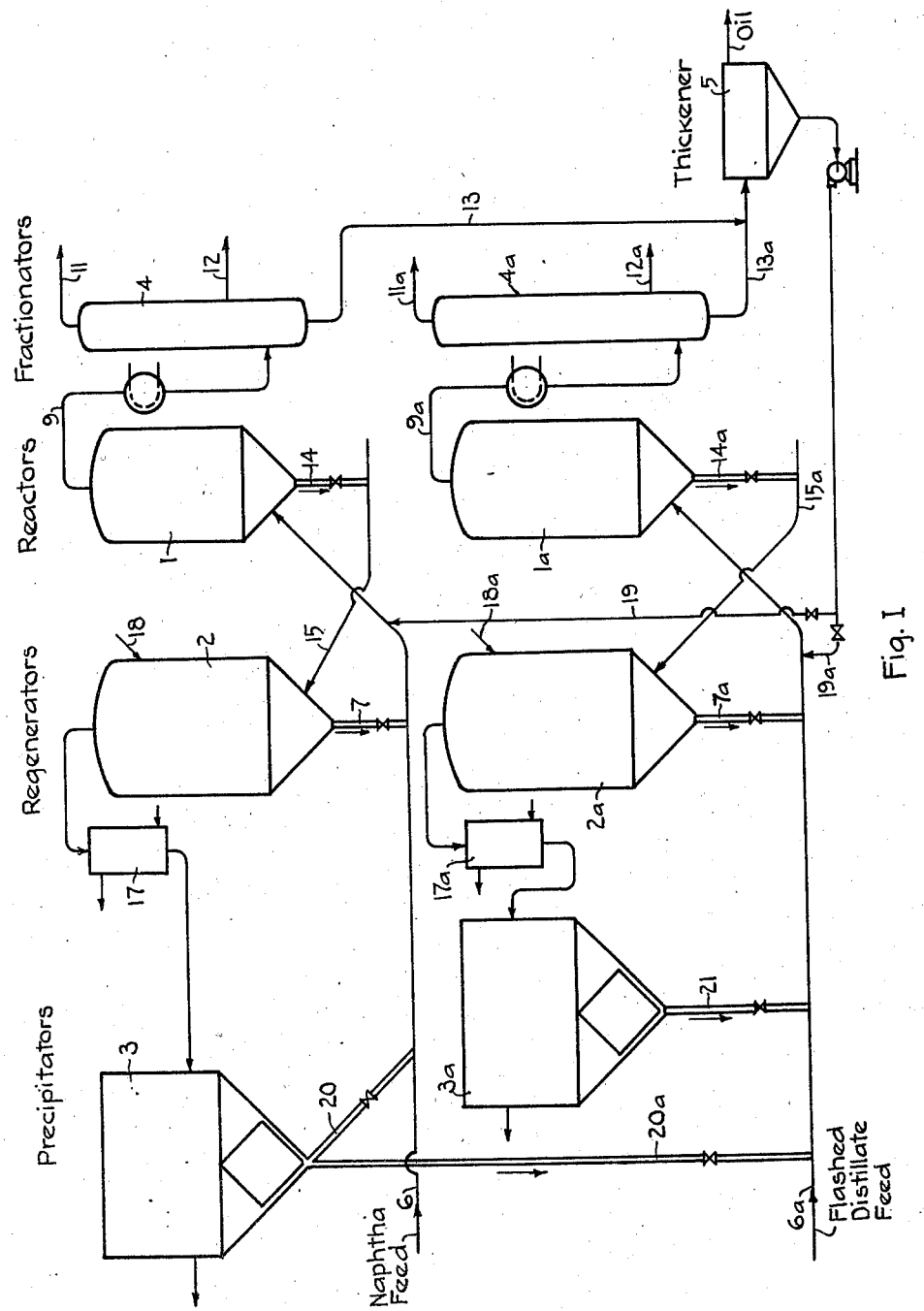

Dec. 16, 1947.  H. D. LOEB  2,432,912
CATALYTIC TREATMENT OF HYDROCARBONS
Filed Aug. 21, 1945   2 Sheets-Sheet 1

Inventor: Henry D. Loeb
By his Attorney:

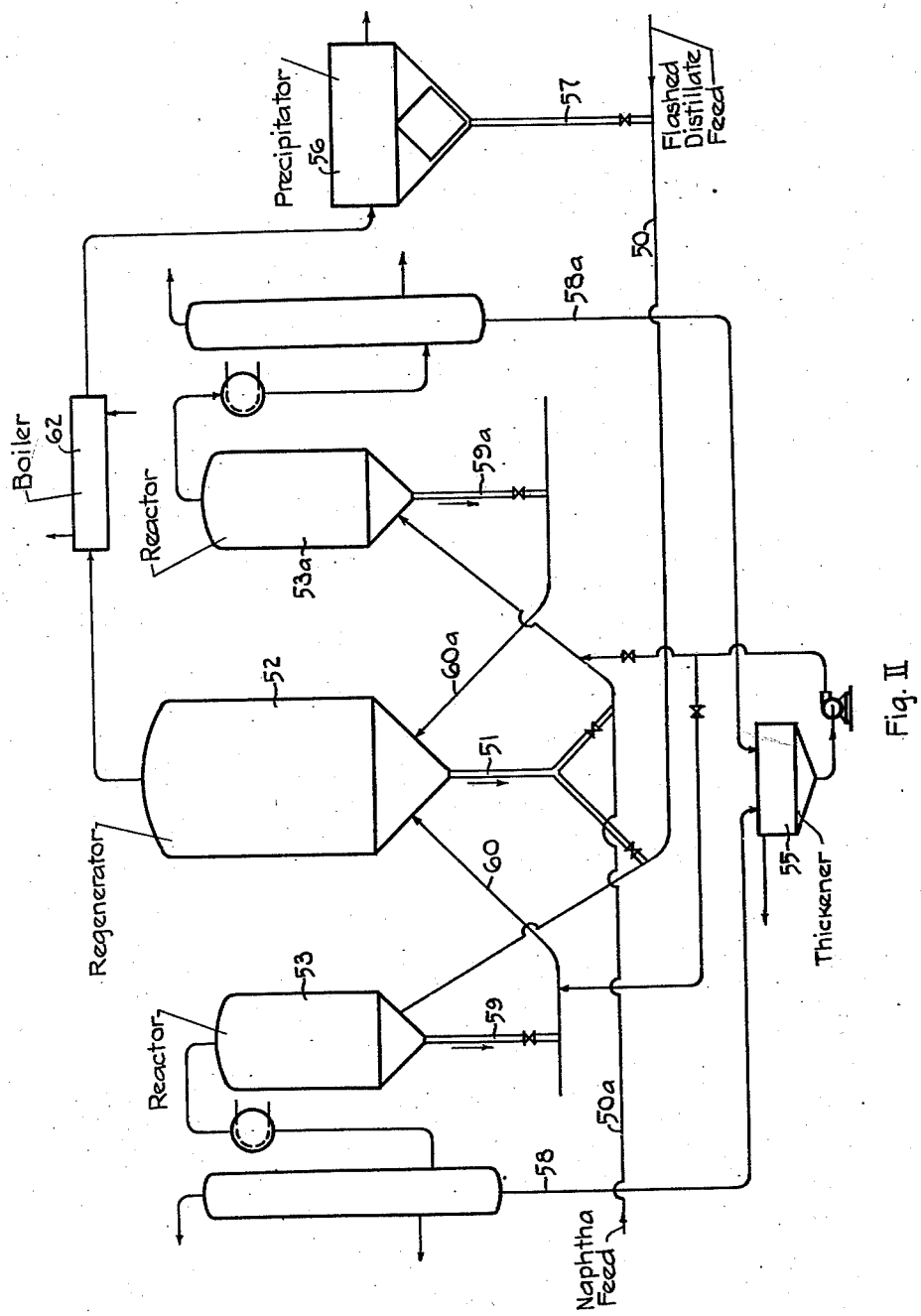
Fig. II

Patented Dec. 16, 1947

2,432,912

UNITED STATES PATENT OFFICE 2,432,912

CATALYTIC TREATMENT OF HYDROCARBONS

Henry D. Loeb, San Francisco, Calif., assignor to Shell Development Company, San Francisco, Calif., a corporation of Delaware Application August 21, 1945, Serial No. 611,763

9 Claims. (Cl. 196—52)

This invention relates to catalytic treatments with finely divided solid catalysts using the so-called fluidized catalyst technique.

In the application of solid catalysts the primary considerations are to provide means for contacting the reactant or reactants with the catalyst surface under optimum conditions of temperature, pressure and time, and often to provide means for conveniently and effectively treating the catalyst to maintain its activity. There are several basic techniques and numerous modifications thereof for accomplishing these ends and some are better suited for certain cases than others. One basic technique which is particularly advantageous where the catalyst requires frequent regeneration or activation treatment is the so-called fluidized catalyst technique. The fluidized catalyst technique makes use of the fact that dry finely divided solid catalysts become fluidized when aerated with certain amounts of gases or vapors and behave in many respects like a liquid. They flow like a liquid, can be pumped like a liquid, exert a static pressure like a liquid, and gases or vapors can be bubbled up through the fluidized catalyst much as with a liquid. There are many particular modifications of the fluid catalyst technique which are said to have advantages in one respect or another. Although these various modifications differ in many respects, it will be found that certain features are common. The catalyst is ground to a finely divided or powdered state. The catalyst particles range from about 2 or 3 microns in diameter up to about 100 mesh particles, although some larger particles up to about 20 mesh may be present. During use the particles are continually being worn down and broken up. The distribution of particle size therefore depends primarily upon the resistance of the particles to wear by attrition and only to a minor extent upon the replacement rate and the particle size of the material added for replacement. Thus, with a catalyst which is resistant to wear by attrition, the amount of material smaller than 20 microns in diameter is usually in the order of 15 to 30% of the whole, and with relatively more friable catalysts, the amount of material smaller than 20 microns in diameter is usually in the order of 30% to 55% of the whole. The catalyst is employed in the reaction and regeneration zones in a fluidized or pseudo-liquid condition. The fluidized catalyst usually has a density between about 5 and 30 pounds per cubic foot depending upon the degree of fineness of the catalyst, the density of the catalyst particles, and the viscosity and flow rate of the aerating gas or vapor. In the reactor the vapors of the reactant contact the fluidized catalyst and in the regenerator the regeneration gases contact the fluidized catalyst. The vapors or gases leaving the fluid catalyst bed carry in suspension a small but appreciable concentration of suspended catalyst. This suspended catalyst is separated from the vapor or gas in one or more separators such as multistage cyclone separators and is retained in the system. The separators remove the larger particles above about 15–20 microns in diameter quite efficiently. However, their efficiency is somewhat less for the finer particles and a small but appreciable amount of these fine particles is carried in suspension with the gases or vapors from the separators. In order to avoid losses of catalyst these fines are separately recovered from the spent regeneration gases and returned to the system. This separation is effected by means of electrical precipitators (Cottrell precipitators) or in a few cases by bag filters or by scrubbing systems of particular design.

These systems are particularly advantageous for effecting various catalytic oil refining and treating processes such as catalytic cracking, catalytic reforming, isoforming, dehydrocyclization, and hydroforming. These various processes are usually inter-related and integrated. For example, a petroleum may be fractionated into a straight run gasoline, kerosene, straight run naphtha, Diesel oil, gas oil and stove oil fractions, and a heavy residue; the straight run gasoline fraction may be reformed or hydroformed; the kerosene may be thermally cracked; the straight run naphtha may be catalytically cracked; the gas oil and stove oil may be separately catalytically cracked; the heavy residue may be vacuum flashed and the flashed distillate may be catalytically cracked; the reformed straight run gasoline and/or the gasoline from the thermal cracking of the kerosene may be isoformed; the catalytically cracked gasoline may be catalytically reformed; the uncracked residue from the catalytic cracking may be retreated under more severe cracking conditions. Several of these processes may usually be carried out with the same plant and the same catalyst. For example, catalytic cracking, recracking, repassing and isoforming may all be advantageously carried out with a single silica-alumina composite catalyst, a boria-alumina composite catalyst, a silica-alumina-zirconia composite catalyst, a boria-alumina-zirconia composite catalyst or any one of a number of other related catalysts. Catalytic reforming, dehydrocyclization, and hydroforming, on the other hand, may all be advantageously carried out with a single catalyst such as chromia-alumina, molybdena-alumina, cobalt molybdate-alumina, or any one of a number of related catalysts. Each of these processes, however, requires different conditions of temperature, pressure and space velocity to obtain optimum results. Also, different conditions are indicated for any given process depending upon the feed stock to be treated. For example, in catalytic cracking different conditions are indicated for such materials as light naphtha, light gas oil, heavy gas oil, flashed distillate and various recycle stocks. Even differences in origin often indicate different treating conditions. For example, a California gas oil of a certain boiling range will usually require somewhat different conditions than a West Texas gas oil of the same boiling range. The treatment of these various materials is accomplished either by resorting to blocked out operation or by providing two or more fluid catalyst plants, each of which is operated at or near to optimum conditions for the particular feed. Because of unavoidable variations in feed stocks, however, the plants are always designed for the best all-round performance and, although optimum conditions can be maintained for any given feed, the optimum economy of operation is usually not obtained. This has led in some cases to the necessity of treating mixtures of feeds under average conditions where separate treatment under different conditions would be indicated.

This difficulty or disadvantage can be overcome and different feeds can be treated under optimum conditions while still maintaining maximum efficiency and capacity in parallel units if the two or more treating units are integrated in the manner hereinafter described. The process of the present invention in its broader aspect comprises simultaneously effecting two or more catalytic conversions or a catalytic conversion of two or more different materials under essentially optimum conditions for each in two or more fluid catalyst units with finely divided catalyst having the same composition and range of particle size, and maintaining the concentration of catalyst fines in one unit below normal and the concentration of catalyst fines in another unit above normal, thereby altering the catalyst density and catalyst bed height per given throughput rate and to allow maximum efficiency in each unit. The concentration of fines, hereinafter expressed in terms of the percent by weight of the catalyst smaller than 20 microns in diameter, is maintained at different levels in the two or more units, preferably by methods hereinafter described.

A typical application of the process of the invention is in the catalytic cracking of two feed stocks in two parallel fluid catalyst cracking plants. The process of the invention will therefore be more particularly described in connection with such an operation. It will be understood that the invention is not limited to catalytic cracking nor, for that matter, to effecting the same conversion in both units. Thus, it may be advantageously used for effecting catalytic cracking in one unit and isoforming in the other and many other such combinations of processes using the same catalyst. The material to be cracked may be most any two different stocks which give optimum yields, etc., when cracked under somewhat different conditions. A typical example would be, for instance, a straight run naphtha and a flashed distillate from a reduced crude and this combination will be used to illustrate the invention. The naphtha fraction is preferably cracked at a lower temperature and at a much lower space velocity than the flashed distillate. It gives a much lower yield of coke than the flashed distillate. Under ordinary conditions using two parallel fluid catalyst plants to crack these two materials under optimum conditions the reactor of the unit cracking the naphtha is substantially full and the reactor of the unit cracking the flashed distillate is nearly empty. Thus, the reactor capacity limits the production capacity in the first case; the regenerator capacity limits the production in the second case; and neither unit operates at maximum capacity.

The catalyst used for such a combination of processes may be any one of the various known clay type cracking catalysts. Typical examples of such catalysts are the activated clay catalysts such as Super Filtrol and the various synthetic composite catalysts such as silica-alumina, silica-alumina-zirconia, silica-zirconia, silica, magnesia, alumna-aluminum fluoride magnesium fluoride, alumina-boric oxide, alumina-silica-boric oxide, alumina-zirconia-boric oxide. For purposes of illustration an operation using a synthetic alkali-free composite of silica-alumina containing about 25% alumina and about 2 to 5% water of constitution ground to pass a 100 mesh sieve will be described.

The main features and flow lines of two suitable plants are illustrated in the attached drawings, Figures I and II. Referring to Figure I, the plant comprises two catalytic converters of the bottom-draw-off type I and Ia, two catalytic regenerators of the bottom-draw-off type 2 and 2a, two Cottrell precipitators 3 and 3a, two fractionating columns 4 and 4a, and a thickener 5. The two feed stocks enter the respective units via lines 6 and 6a. The naphtha feed enters via line 6, picks up freshly regenerated catalyst from standpipe 7 of regenerator 2 and the mixture passes to the catalytic converter I wherein the naphtha is cracked under optimum conditions of temperature, pressure, space velocity and catalyst residence time. The cracked vapors carrying suspended catalyst pass through the internal cyclone separators (not shown). The separated catalyst is returned to the main catalyst bed and the cracked vapors pass overhead via line 9 to fractionator 4. Cracked products pass overhead via line 11 and the heavy uncracked or partially cracked material is withdrawn via line 12 as products of the process. A small amount of heavy oil is withdrawn from the bottom via line 13. This heavy oil usually contains a small amount of catalyst which escapes separation in separator 8. This oil, if desired, may be passed to a settler or thickener such as the thickener 5 to concentrate the small amount of catalyst so that it can be recovered. This small amount of slurry is insufficient to make any noticeable change in the concentration of fines in either unit if recycled. It may be recycled to either unit or to both units. However, it is preferably cycled to the unit operating with the sub-normal concentration of fines. Thus, it is advantageously recycled to reactor I via line 19.

A portion of the partially spent catalyst in reactor I is continuously withdrawn via standpipe 14. This material is picked up by a stream of regeneration gas and carried via line 15 to the regenerator 2. Suspended catalyst is separated from the effluent regeneration gas and retained in the system by internal separators (not shown). The effluent regeneration gases pass through a waste heat boiler 17 and then to the electrical precipitator 3. The electrical precipitator removes most of the fines which escape separation in the separator 16. Thus, in a typical plant the electrical precipitator recovers about 36 to 50 tons per day of a material which is essentially all 0–20 micron material with a loss of about 1½ tons per day. This material has about the same activity as the main catalyst mass.

The second unit operates in an analogous manner except that the feed is, for example, the flashed distillate and therefore will not be described in detail.

According to the process of the present invention the proportion of fines in the two units is maintained at different levels. Thus, if the normal proportion of fines using the particular catalyst is 25%, the proportion of fines in reactor 1 and regenerator 2 is maintained below 25% and the proportion of fines in reactor 1a and regenerator 2a is maintained above 25%. In a typical operation for example using a catalyst ranging from 1–2 microns up to 100 mesh, the respective concentrations of fines may be 4% and 38%, the catalyst being otherwise identical. This condition is brought about and maintained by cycling all or at least the major portion of the material collected by the Cottrell precipitators to reactor 1a and regenerator 2a via lines 20a and 21. Since the amount of fines collected in the Cottrell precipitators is usually considerable, it is sometimes desirable to return all of the fines from Cottrell precipitator 3a to reactor 1a via line 21 and to pass a portion of the fines collected in Cottrell precipitator 3 to reactor 1a via line 20 and to return the remainder of the fines from precipitator 3 back to reactor 1 via line 20a. The small amount of fresh catalyst necessary to compensate for catalyst losses may be added to both units in proportion to the losses from each. Lines 18 and 18a are provided for this addition. However, at least at the beginning of the operation it may be preferred to add all of such replacement catalyst to the unit having the sub-normal concentration of fines in order to compensate for the higher initial losses from this unit.

The above described system utilizes reactors and regenerators of the preferred bottom-draw-off type and two Cottrell precipitators. If desired, however, a single Cottrell precipitator may serve both units.

Also, the two systems may be further integrated by operating both reactors off of one regenerator which may be either of the up-flow or bottom-draw-off type. Such a system is illustrated in Figure II. Referring to Figure II, the two materials to be treated enter via lines 50 and 50a and pick up freshly regenerated catalyst from the standpipe 51 of the bottom-draw-off regenerator 52. The naphtha and catalyst, for example, passes to reactor 53a where it is contacted with the main body of fluid catalyst below normal in fines. Suspended catalyst is separated from the effluent vapors by internal cyclone separators (not shown) and retained in the system. The cracked products pass to a fractionator as before and a small amount of oil containing a small amount of catalyst is sent to the thickener 55. The flashed distillate picks up all of the fines separated by the Cottrell precipitator 56 (entering via line 57) and then picks up additional fresh catalyst from the standpipe 51 of regenerator 52 and the mixture passes via line 58 to reactor 53 where the flashed distillate is contacted with the main body of fluidized catalyst above normal in fines. Suspended catalyst is separated from the effluent vapors by internal separators (not shown) and retained in the system. The cracked vapors pass overhead as before to a fractionator and a small amount of oil containing a small amount of catalyst is passed via line 58 to the thickener. Partially spent catalyst from the two reactors is withdrawn via standpipe 59 and 59a and is picked up by separate streams of regeneration gas and carried via lines 60 and 60a to the regenerator 52. The main portion of suspended catalyst is separated from the effluent regeneration gases by internal separators (not shown) and retained in the system. The spent regeneration gases pass through a waste heat boiler 62 and then to the Cottrell precipitator 56 where additional 0–20 micron material is recovered. This recovered 0–20 micron material is cycled to reactor 53 as described. In this system the concentration of fines in reactor 53 is maintained considerably higher than that in reactor 53a, and at the same time the concentration of fines in reactor 53a cannot become so low that difficulty is encountered in maintaining a proper fluidized state.

The application of the principles of the invention described and illustrated above allows the reactor capacities of the respective reactors in existing plants to be utilized more efficiently and to thereby increase the production from each when treating two materials under different conditions. In normal operation with a normal catalyst and with reactors and regenerators of given capacities the reactor used to treat a feed, such as the above-mentioned naphtha fraction, is as full as possible with fluidized catalyst. The reactor is then considered as operating at maximum production capacity. However, the production capacity can be increased much beyond this apparently limiting capacity by increasing the weight of catalyst in the reactor. This is accomplished by increasing the density of the fluid catalyst phase. Under any given state of conditions the proportion of fines in the catalyst of any given range of particle size affects the density of the fluidized catalyst to a remarkable extent. Thus, for example, a given 1 micron to 100 mesh catalyst containing 20% fines may have a fluidized catalyst density under a given set of conditions of about 18 pounds per cubic foot. By the addition of fines to say 40%, the density of the fluidized catalyst is reduced to about 10–14 pounds per cubic foot. On the other hand, by removing the fines to below about 5% the density of the fluidized catalyst is increased to about 25–30 pounds per cubic foot. Thus, when operating according to the process of the present invention the reactor containing catalysts below normal in fines may actually employ about 1½ times as much catalyst as the reactor operating with normal catalysts. The production capacity of such a reactor may, therefore, be increased to about 1½ times the normal production capacity.

In normal operation with the normal catalyst and with reactors and regenerators of given capacities the other feed (such as the flashed distillate mentioned) is preferably treated at a much higher weight hourly space velocity. Here the carbon burning capacity of the regenerator is usually the limiting factor. For this and other reasons the reactor is only partially filled with catalyst. This is disadvantageous in two respects. In the first place the reactor is not being utilized to capacity and in the second place the efficiency of the treatment is impaired by the low depth of the fluidized catalyst bed. In operating according to the process of the invention both of these disadvantages are decreased or eliminated. The catalyst used in the reactor is above normal in concentration of fines. This catalyst therefore affords a low fluidized catalyst density and consequently a considerably increased depth of catalyst per unit of weight. For example, in a typical operation using a normal catalyst the reactor treating the flashed distillate contains only about 30-40 tons of catalyst and this provides a bed depth of only about 17-20 feet. By decreasing the fluid catalyst density by increasing the concentration of fines, the bed depth may be increased to about 28 feet with the same weight of catalyst. This affords a considerably lower liquid hourly space velocity and therefore a considerably longer contact and affords a more efficient and better treatment. As in the above example the higher concentration of fines is usually maintained in the reactor operating at the higher space velocity. Also, the depth of catalyst in the regenerator (if a separate regenerator is used) is increased, thus affording a more efficient regeneration.

It will be seen that by applying the principles of the present invention the efficiency and production capacity of both units may be considerably increased over those obtained with what has hitherto been considered the most efficient utilization of the equipment. These advantages may be realized in treating any two materials which have different optimum treating conditions with the same catalyst regardless of whether or not the two treatments are of the same type. Thus, for example, one of the treatments may be catalytic cracking and the other isoforming. In fact, the advantages are usually more pronounced in such cases since the advantages are more pronounced the more different the optimum treating conditions for the respective feeds.

In the above and in the following claims, the term "normal" is used to designate the conditions when operating in the usual or described manner without the described and specified displacement of catalyst fines within the two integrated systems.

I claim as my invention:

1. In a process for the simultaneous catalytic cracking of two hydrocarbon oils, each of which is cracked under different conditions including different space velocities with a fluidized finely divided cracking catalyst having the same composition and the same range of particle size in two separate cracking zones, and wherein a portion of the finely divided catalyst is continuously subjected to regeneration separate from said cracking treatments and recycled, the improvement which comprises maintaining the proportion of 0-20 micron particles in the catalyst in one of said cracking zones above normal and the proportion of 0-20 micron particles in the catalyst in the other of said cracking zones below normal, thereby providing more nearly optimum fluidized catalyst densities and more nearly uniform optimum depth of fluidized catalyst bed in the respective cracking zones per given weight of catalyst, by recovering regenerated catalyst particles predominantly of the 0-20 micron size range separately from the bulk of the regenerated catalyst and cycling said separately recovered 0-20 micron size particles predominantly to the cracking zone operating at the higher space velocity.

2. In a process for the simultaneous catalytic cracking of two hydrocarbon oils, each of which is treated under different conditions with a fluidized finely divided cracking catalyst of a given composition and range of particle size in two separate cracking zones and wherein a portion of the finely divided catalyst is continuously subjected to regeneration separate from said cracking zones and recycled, the improvement which comprises maintaining the proportion of 0-20 micron particles in the catalyst in one of said cracking zones above normal and the proportion of 0-20 micron particles in the catalyst in the other of said cracking zones below normal, thereby providing more nearly optimum catalyst densities and a more nearly uniform optimum depth of fluidized catalyst bed in the respective cracking zones per given weight of catalyst by recovering regenerated catalyst particles of predominantly the 0-20 micron size range separately from the bulk of the regenerated catalyst and cycling said separately recovered 0-20 micron size particles predominantly to the first mentioned cracking zone.

3. In a process for the simultaneous catalytic treatment of two materials, each of which is treated under different conditions including different space velocities with a fluidized finely divided catalyst having the same composition and the same range of particle size in two separate treating zones, and wherein a portion of the finely divided catalyst is continuously subjected to regeneration separate from said treatments and recycled, the improvement which comprises maintaining the proportion of 0-20 micron particles in the catalyst in one of said treating zones above normal and the proportion of 0-20 micron particles in the catalyst in the other of said treating zones below normal, thereby providing more nearly optimum fluidized catalyst densities and more nearly uniform optimum depth of fluidized catalyst bed in the respective treating zones per given weight of catalyst by recovering regenerated catalyst particles predominantly of the 0-20 micron size range separately from the bulk of the regenerated catalyst and cycling said separately recovered 0-20 micron size particles predominantly to the treating zone operating at the higher space velocity.

4. In a process for the simultaneous catalytic treatment of two materials, each of which is treated under different conditions with a fluidized finely divided catalyst having the same composition and consisting essentially of particles ranging from about 1 micron diameter up to about 100 mesh particles in two separate treating zones, and wherein a portion of the finely divided catalyst is continuously subjected to regeneration separate from said treatments and recycled, the improvement which comprises maintaining the proportion of 0-20 micron particles in the catalyst in one of said treating zones above normal and the proportion of 0-20 micron particles in the catalyst in the other of said treating zones below normal, thereby providing more nearly optimum fluidized catalyst densities and a more nearly uniform optimum depth of fluidized catalyst bed in the respective treating zones per given weight of catalyst, by recovering regenerated catalyst particles predominantly of the 0-20 micron size range separately from the bulk of the regenerated catalyst and cycling said separately recovered 0-20 micron size particles predominantly to the first mentioned treating zone.

5. In a process for the simultaneous catalytic treatment of two materials, each of which is treated under different conditions with a fluidized finely divided catalyst having the same composition and same range of particle size in two separate treating zones of the described bottom-draw-off type, and wherein a portion of the finely divided catalyst is continuously subjected to regeneration separate from said treatments and recycled, the improvement which comprises maintaining the proportion of 0-20 micron particles in the catalyst in one of said treating zones above normal and the proportion of 0-20 micron particles in the catalyst in the other of said treating zones below normal, thereby providing more nearly optimum fluidized catalyst densities and a more nearly uniform optimum depth of fluidized catalyst bed in the respective treating zones per given weight of catalyst, by recovering regenerated catalyst particles predominantly of the 0-20 micron size range separately from the bulk of the regenerated catalyst and cycling said separately recovered 0-20 micron size particles predominantly to the first mentioned treating zone.

6. In a process for the simultaneous catalytic treatment of two materials, each of which is treated under different conditions with a fluidized finely divided catalyst having the same composition and the same range of particle size in two separate treating zones, and wherein a portion of the finely divided catalyst is continuously subjected to regeneration separate from said treatments and recycled, the improvement which comprises maintaining the proportion of 0-20 micron particles in the catalyst in one of said treating zones above normal and the proportion of 0-20 micron particles in the catalyst in the other of said treating zones below normal, thereby providing more nearly optimum fluidized catalyst densities and a more nearly uniform optimum depth of fluidized catalyst bed in the respective treating zones per given weight of catalyst, by recovering regenerated catalyst particles predominantly of the 0-20 micron size range separately from the bulk of the regenerated catalyst and cycling said separately recovered 0-20 micron size particles predominantly to the first mentioned treating zone.

7. In a process for the simultaneous catalytic treatment of two materials, each of which is treated under different conditions with a fluidized finely divided catalyst having the same composition and the same range of particle size in two separate treating zones, and wherein a portion of the finely divided catalyst from each of said zones is continuously subjected to regeneration in a separate common regeneration zone and recycled therefrom to the respective treating zones, the improvement which comprises maintaining the proportion of finer catalyst particles in the catalyst in one of said treating zones above normal and the proportion of finer catalyst particles in the catalyst in the other of said treating zones below normal, thereby providing more nearly optimum fluidized catalyst densities and a more nearly uniform optimum depth of fluidized catalyst bed in the respective treating zones per given weight of catalyst, by separating fine catalyst particles separately from the bulk of the regenerated catalyst and cycling said separated fine catalyst particles predominantly to the first mentioned treating zone.

8. In a process for the simultaneous catalytic treatment of two materials, each of which is treated under different conditions including different space velocities with a fluidized finely divided catalyst having the same composition and the same range of particle size in two separate treating zones, and wherein a portion of the finely divided catalyst from each of said zones is continuously subjected to regeneration in a separate common regeneration zone and recycled therefrom to the respective treating zones, the improvement which comprises maintaining the proportion of 0-20 micron particles in the catalyst in one of said treating zones above normal and the proportion of 0-20 micron particles in the catalyst in the other of said treating zones below normal, thereby providing more nearly optimum fluidized catalyst densities and a more nearly uniform optimum depth of fluidized catalyst bed in the respective treating zones per given weight of catalyst, by recovering regenerated catalyst particles predominantly of the 0-20 micron size range separately from the bulk of the regenerated catalyst and cycling said separately recovered 0-20 micron size particles predominantly to the treating zone operating at the higher space velocity.

9. In a process for the simultaneous catalytic treatment of two materials, each of which is treated under different conditions with a fluidized finely divided catalyst having the same composition and the same range of particle size in two separate treating zones, and wherein a portion of the finely divided catalyst is continuously subjected to regeneration separate from said treatments and recycled, the improvement which comprises maintaining the proportion of 0-20 micron particles in the catalyst in one of said treating zones above normal and the proportion of 0-20 micron particles in the catalyst in the other of said treating zones below normal, thereby providing more nearly optimum fluidized catalyst densities and a more nearly uniform optimum depth of fluidized catalyst bed in the respective treating zones per given weight of catalyst, by recovering regenerated catalyst particles predominantly of the 0-20 micron size range separately from the bulk of the regenerated catalyst and cycling all of said separately recovered 0-20 micron size particles to the first mentioned treating zone.

HENRY D. LOEB.

REFERENCES CITED

The following references are of record in the file of this patent:

UNITED STATES PATENTS

| Number | Name | Date |
| --- | --- | --- |
| 2,349,574 | Conn | May 23, 1944 |
| 2,349,575 | Voorhees | May 23, 1944 |
| 2,358,888 | Thomas | Sept. 26, 1944 |
| 2,382,755 | Tyson | Aug. 14, 1945 |